(12) United States Patent
Pautis et al.

(10) Patent No.: US 11,713,128 B2
(45) Date of Patent: Aug. 1, 2023

(54) ASSEMBLY INCLUDING TWO LINKS AND AN INTERLEAVED STIFFENER, AIRCRAFT ENGINE ATTACHMENT INCLUDING AT LEAST ONE SUCH ASSEMBLY

(71) Applicant: Airbus Operations SAS, Toulouse (FR)

(72) Inventors: Olivier Pautis, Toulouse (FR); Michael Berjot, Toulouse (FR); Olivier Dubois, Toulouse (FR); Germain Gueneau, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/318,454

(22) Filed: May 12, 2021

(65) Prior Publication Data
US 2021/0354839 A1 Nov. 18, 2021

(30) Foreign Application Priority Data

May 14, 2020 (FR) ...................................... 2004738

(51) Int. Cl.
*B64D 27/26* (2006.01)
(52) U.S. Cl.
CPC ........ *B64D 27/26* (2013.01); *B64D 2027/268* (2013.01)
(58) Field of Classification Search
CPC ........................... B64D 27/26; B64D 2027/268
See application file for complete search history.

(56) References Cited

U.S. PATENT DOCUMENTS

| 8,757,579 B2 * | 6/2014 | Bonnet | F16F 7/125 244/54 |
|---|---|---|---|
| 10,371,009 B2 | 8/2019 | De Sousa et al. | |
| 2012/0018576 A1 | 1/2012 | Bonnet et al. | |
| 2020/0180773 A1 | 6/2020 | Blacha et al. | |

FOREIGN PATENT DOCUMENTS

| CA | 3055737 A1 | 11/2019 |
| EP | 2410202 A1 | 1/2012 |

OTHER PUBLICATIONS

French Search Report; priority document.

* cited by examiner

*Primary Examiner* — Christopher D Hutchens
*Assistant Examiner* — Steven J Shur
(74) *Attorney, Agent, or Firm* — Greer, Burns & Crain, Ltd.

(57) ABSTRACT

An assembly including a connecting device, connecting first and second parts, including first and second links positioned on respective opposite sides of the first and second parts and an interleaved stiffener, positioned between the first and second links, having a first contact face oriented toward the first link and a second contact face oriented toward the second link, parallel to the first face, the first and second contact faces being separated by a distance equal to that separating the first and second links. This interleaved stiffener makes it possible to limit the risks of bending of the links when they are loaded in compression.

9 Claims, 2 Drawing Sheets

Fig. 1 Prior Art
Fig. 4
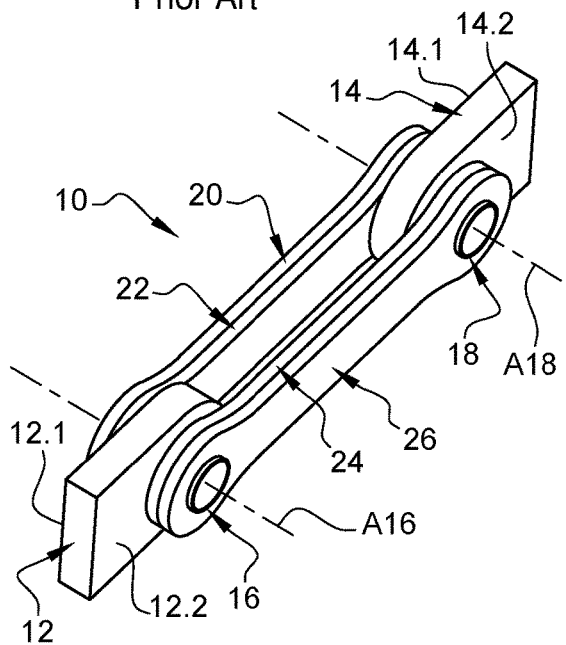
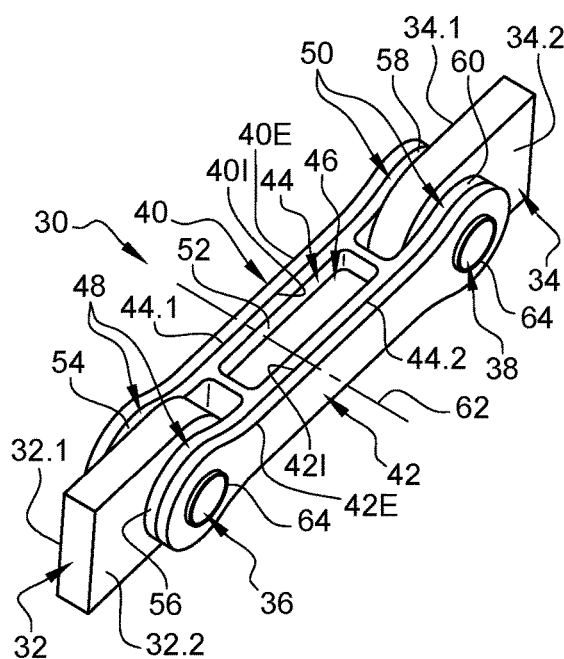
Fig. 2 Prior Art
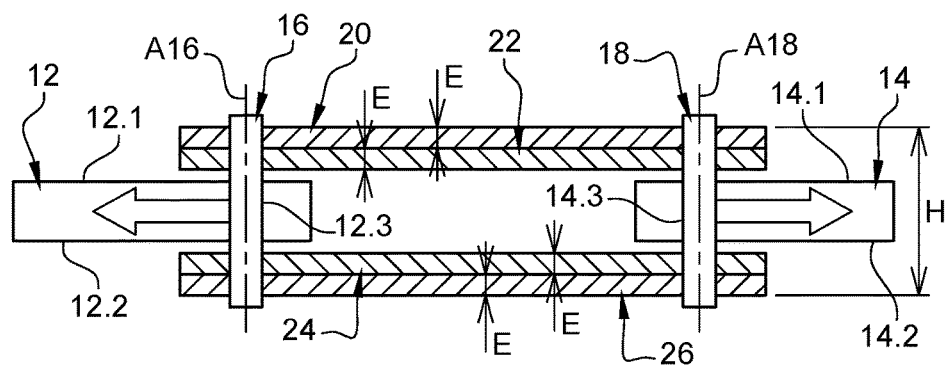
Fig. 3 Prior Art
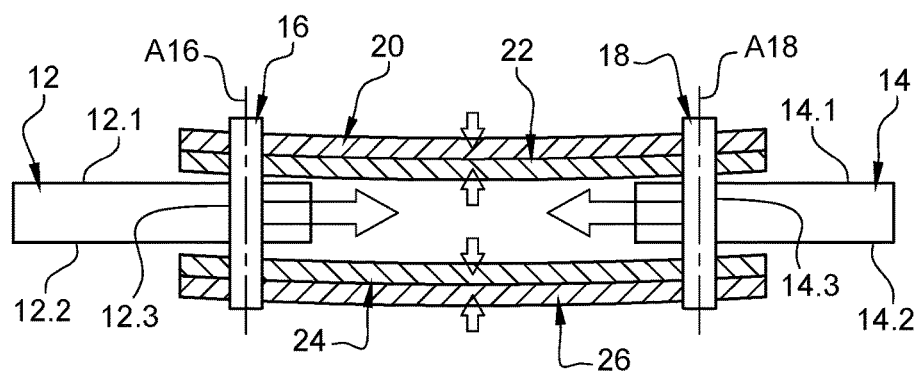

ASSEMBLY INCLUDING TWO LINKS AND AN INTERLEAVED STIFFENER, AIRCRAFT ENGINE ATTACHMENT INCLUDING AT LEAST ONE SUCH ASSEMBLY

CROSS-REFERENCES TO RELATED APPLICATIONS

This application claims the benefit of the French patent application No. 2004738 filed on May 14, 2020, the entire disclosures of which are incorporated herein by way of reference.

FIELD OF THE INVENTION

The present invention relates to an assembly including two links and an interleaved stiffener and an aircraft engine attachment including at least one such assembly.

BACKGROUND OF THE INVENTION

In accordance with an embodiment that can be seen in FIGS. 1 to 3, an engine attachment includes an assembly 10 connecting a first part 12 rigidly attached to a propulsion unit and a second part 14 rigidly attached to a primary structure of an aircraft pylon.

The first part 12 has first and second faces 12.1, 12.2 parallel to one another and a first through-hole 12.3 opening at the level of the first and second faces 12.1, 12.2.

The second part 14 has first and second faces 14.1, 14.2 parallel to one another and a second through-hole 14.3 opening at the level of the first and second faces.

The assembly 10 includes first and second cylindrical articulation elements 16, 18, respectively accommodated in the first and second through-holes 12.3, 14.3, and two pairs of links 20, 22, 24, 26 connecting the first and second articulation elements 16, 18, disposed on respective opposite sides of the first and second parts 12, 14.

The first and second articulation elements 16, 18 have axes A16, A18 approximately parallel to one another.

In the remainder of the description, a transverse direction is parallel to the axes A16, A18 of the articulation elements 16, 18. A longitudinal plane is perpendicular to the transverse direction. A longitudinal direction is a direction perpendicular to the transverse direction passing through the two axes A16 and A18.

Each of the links 20, 22, 24, 26 takes the form of a plate that includes a first orifice to accommodate the first articulation element 16 and a second orifice to accommodate the second articulation element 18. The links 20, 22, 24, 26 of each pair are independent and pressed against one another. These various links 20, 22, 24, 26 are identical and have the same thickness E.

When traction forces are exerted at the level of the first and second articulation elements 16, 18, as illustrated in FIG. 2, in each pair of links the links 20, 22, 24, 26 remain pressed against one another and positioned in longitudinal planes. Each of the links 20, 22, 24, 26 is sized taking account of its shear section.

When compression forces are exerted at the level of the first and second articulation elements 16, 18, as illustrated in FIG. 3, in each pair of links the links 20, 22, 24, 26 tend to be deformed by bending in the transverse direction. To limit this buckling effect, it is necessary to increase the transverse inertia of each link 20, 22, 24, 26 by increasing its thickness E. Increasing the thickness of each of the links 20, 22, 24, 26 tends significantly to increase the total thickness H of the assembly 10 at the level of each of the articulation elements 16, 18.

The present invention aims to remedy some or all of the drawbacks of the prior art.

SUMMARY OF THE INVENTION

To this end, the invention has for an object an assembly comprising first and second parts and a connecting device connecting the first and second parts, the connecting device including first and second connecting elements accommodated in first and second holes through the first and second parts and first and second links, connecting the first and second connecting elements, positioned on respective opposite sides of the first and second parts.

In accordance with the invention, the connecting device includes an interleaved stiffener, positioned between the first and second links, having a first contact face oriented toward the first link and a second contact face oriented toward the second link, parallel to the first face, the first and second contact faces being separated by a distance equal to that separating the first and second links, the interleaved stiffener including:

a body of parallelepiped shape, a first yoke, connected to the body, cooperating with the first part, a second yoke, connected to the body at the end opposite the first yoke, cooperating with the second part, the body, the first yoke and the second yoke forming a single part.

The interleaved stiffener makes it possible to limit the risk of transverse bending of the first and second links. To increase the transverse inertia in order to resist bending, each of the latter therefore has a cross section sized to withstand at least some of the traction and compression forces that is not oversized at the level of the thickness.

In accordance with another feature, the first yoke includes:

a first flange, positioned between the first link and the first part, including an orifice accommodating the first articulation element, a second flange, positioned between the second link and the first part, including an orifice accommodating the first articulation element, and the second yoke includes:

a first flange, positioned between the first link and the second part, including an orifice accommodating the second articulation element, a second flange, positioned between the second link and the second part, including an orifice accommodating the second articulation element.

In accordance with another feature, the first and second flanges of the first and second yokes have external faces coplanar with a first face of the body oriented toward the first link, the external faces of the first flanges and the first face of the body forming the first contact face of the interleaved stiffener. In parallel, the second flanges of the first and second yokes have external faces coplanar with a second face of the body oriented toward the second link, the external faces of the second flanges and the second face of the body forming the second contact face of the interleaved stiffener.

In accordance with another feature, the connecting device includes a system connecting the first and second links and the interleaved stiffener.

In accordance with a first variant, the connecting system includes at least one transverse connecting element, passing through the first and second links and the interleaved stiffener, configured to maintain the first and second links pressed against the interleaved stiffener. In accordance with one configuration, the connecting system includes a plurality of transverse connecting elements divided between the first and second articulation elements.

In accordance with a second variant, the connecting system includes, at the level of each articulation element, a ring, surrounding the articulation element, onto which are force-fitted the first and second links and the interleaved stiffener.

In accordance with another feature, the body of the interleaved stiffener includes at least one opening.

In accordance with another feature, at least one of the first and second links includes at least one longitudinal rib on an external face of the first and/or second link, projecting relative to that external face.

The invention equally has for object an aircraft engine attachment including at least one assembly having any one of the foregoing features.

BRIEF DESCRIPTION OF THE DRAWINGS

Other features and advantages will emerge from the following description of the invention given by way of example only with reference to the appended drawings in which:

FIG. 1 is a perspective view of an assembly illustrating a prior art embodiment, FIG. 2 is a diagrammatic representation of the assembly that can be seen in FIG. 1 subjected to traction forces, FIG. 3 is a diagrammatic representation of the assembly that can be seen in FIG. 1 subjected to compression forces, FIG. 4 is a perspective view of an assembly illustrating a first embodiment of the invention.

DETAILED DESCRIPTION OF THE PREFERRED EMBODIMENTS

Figure 5:
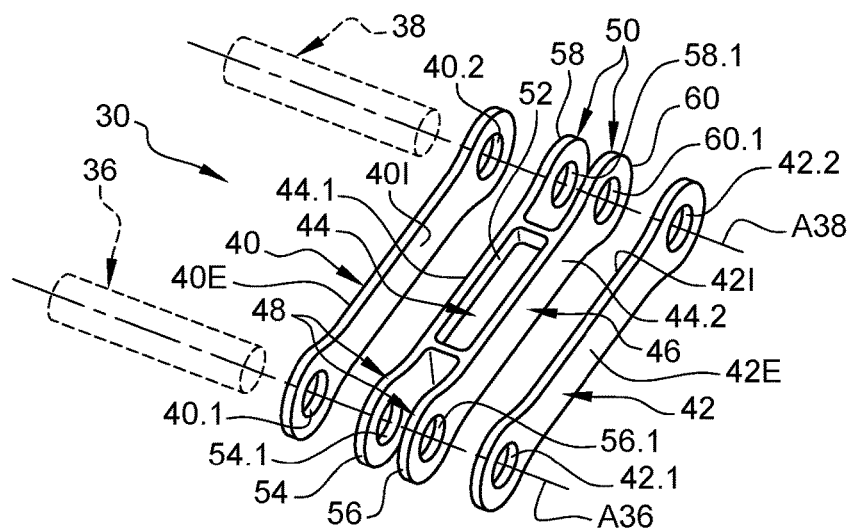
FIG. 5 is a perspective view of a part of the assembly that can be seen in FIG. 4 in the disassembled state.
Figure 6:
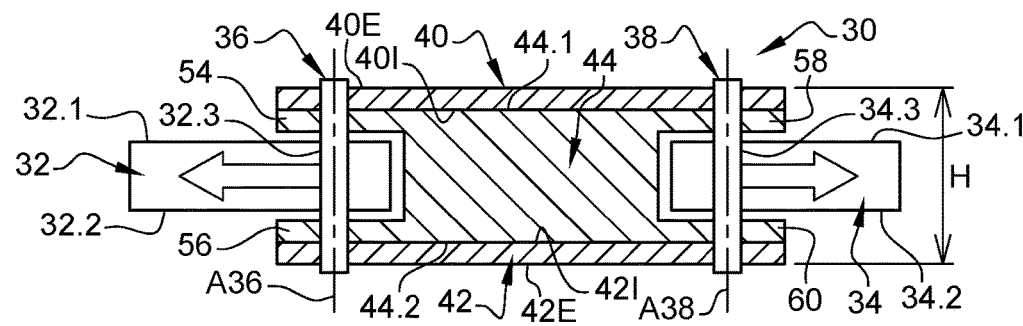
FIG. 6 is a diagrammatic representation of the assembly that can be seen in FIG. 4 subjected to traction forces.
Figure 7:
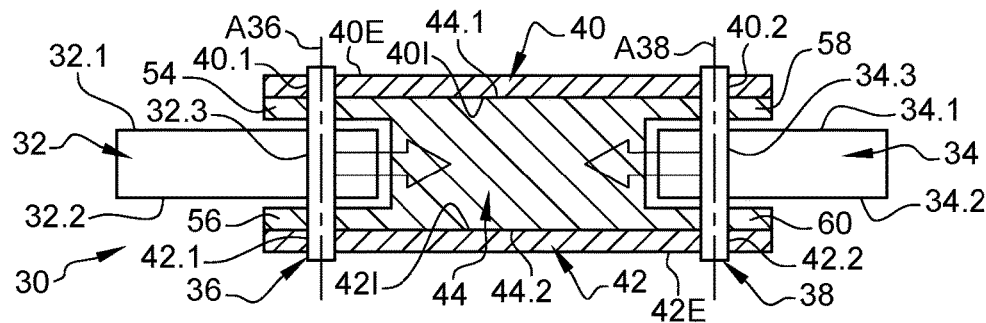
FIG. 7 is a diagrammatic representation of the assembly that can be seen in FIG. 4 subjected to compression forces.

In accordance with one embodiment that can be seen in FIGS. 4 to 7, an assembly includes a connecting device 30 and first and second parts 32, 34 connected by the connecting device 30. In accordance with one application, an aircraft engine attachment includes at least one such assembly, the first part 32 being rigidly attached to an aircraft propulsion unit and the second part 34 being rigidly attached to a primary structure of an aircraft pylon. However, the invention is not limited to that application.

The first part 32 includes first and second faces 32.1, 32.2 parallel to one another and a first through-hole 32.3 opening at the level of the first and second faces 32.1, 32.2.

The second part 34 includes first and second faces 34.1, 34.2 parallel to one another and a second through-hole 34.3 opening at the level of the first and second faces.

In operation, the first faces 32.1, 34.1 of the first and second parts 32, 34 are approximately coplanar as are the second faces 32.2, 34.2 of the first and second parts 32, 34.

The connecting device 30 includes first and second articulation elements 36, 38 respectively accommodated in the first and second through-holes 32.3, 34.3, and first and second links 40, 42 connecting the first and second articulation elements 36, 38, disposed on respective opposite sides of the first and second parts 32, 34. The first and second articulation elements 36, 38 have axes A36, A38 defining the transverse direction, a longitudinal plane and a longitudinal direction.

Each link 40, 42 takes the form of a plate including a first orifice 40.1, 42.1 through the plate positioned at a first end and accommodating the first articulation element 36 and a second orifice 40.2, 42.2 through the plate positioned at a second end and accommodating the second articulation element 32. The plates of the first and second links 40, 42 are parallel to one another and positioned in longitudinal planes. The plates of the first and second links 40, 42 have substantially identical longitudinal sections (in longitudinal planes).

The first link 40 has an internal face 401 oriented toward the second link 42 and an external face 40E opposite the internal face 401, the internal and external faces 401 and 40E being substantially plane, parallel to one another and in operation positioned approximately in longitudinal planes.

The second link 42 has an internal face 421 oriented toward the first link 40 and an external face 42E opposite the internal face 421, the internal and external faces 421 and 42E being substantially plane, parallel to one another and in operation, positioned approximately in longitudinal planes.

The first and second articulation elements 36, 38 and the first and second links 40, 42 are not described further as they may be identical to those of the prior art.

The connecting device 30 equally includes an interleaved stiffener 45 positioned between the first and second links 40, 42. The interleaved stiffener 44 has a first contact face 44.1 oriented toward the first link 40 and a second contact face 44.2 oriented toward the second link 42, parallel to the first face 44.1, the first and second contact faces 44.1, 44.2 being separated by a distance equal to that separating the first and second links 40, 42. The first and second contact faces 44.1, 44.2 of the interleaved stiffener 44 are substantially plane and approximately positioned in longitudinal planes.

In operation, the internal faces 401, 421 of the first and second links 40, 42 are held against the first and second contact faces 44.1, 44.2 of the interleaved stiffener 44.

This interleaved stiffener 44 enables the distance between the first and second links 40, 42 to remain constant in the presence of compression forces and limits the risk of the latter bending transversely. Thus, to increase the transverse inertia in order to resist bending the first and second links 40, 42, each have a cross section sized to withstand at least some of the traction and compression forces that is not oversized at the level of its thickness.

In one configuration the interleaved stiffener 44 includes an approximately parallelepipedal body 46, a first yoke 48, connected to the body 46, configured to cooperate with the first part 32 and to support the first articulation element 36, and a second yoke 50, connected to the body 46 at the end opposite the first yoke 48, configured to cooperate with the second part 34 and to support the second articulation element 38, the body 46 and the first and second yokes 48, 50 forming one part. In this configuration the interleaved stiffener 44 is retained between the first and second links 40, 42 because it is connected to the first and second articulation elements 36, 38. Of course, the invention is not limited to this configuration for retaining the interleaved stiffener 44 between the first and second links 40, 42.

In accordance with one embodiment, the body 46 has a first face oriented toward the first link 40 constituting a part of the first contact face 44.1 of the interleaved stiffener 44 and a second face oriented toward the second link 42 constituting a part of the second contact face 44.2 of the interleaved stiffener 44.

Figure 8:
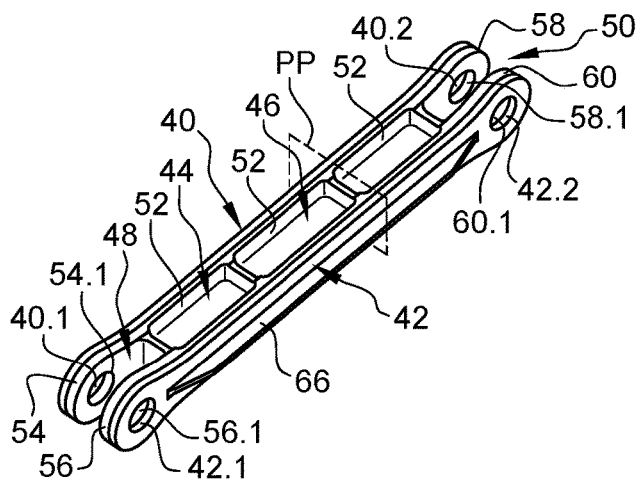
FIG. 8 is a perspective view of a part of an assembly illustrating a second embodiment of the invention.

The body 46 includes at least one opening 52 to reduce its mass, the openings 52 being configured so that the interleaved stiffener 44 retains a high resistance to compression in the transverse direction. Different configurations for the openings 52 may be envisaged, as illustrated in FIGS. 4 and 8.

The first yoke 48 includes a first flange 54 positioned in a longitudinal plane between the first link 40 and the first part 32, including an orifice 54.1 to accommodate the first articulation element 36, and a second flange 56 positioned in a longitudinal plane between the second link 42 and the first part 32, including an orifice 56.1 to accommodate the first articulation element 36. The first and second flanges 54, 56 of the first yoke 48 are separated by a distance greater than or equal to that separating the first and second faces 32.1, 32.2 of the first part 32.

The first flange 54 has an internal face oriented toward the second flange 56 and an external face opposite the internal face coplanar with the first face of the body 46, constituting a part of the first contact face 44.1 of the interleaved stiffener 44.

The second flange 56 has an internal face oriented toward the first flange 54 and an external face opposite the internal face, coplanar with the second face of the body 46, constituting a part of the second contact face 44.2 of the interleaved stiffener 44.

The second yoke 50 includes a first flange 58 positioned in a longitudinal plane between the first link 40 and the second part 34, including an orifice 58.1 to accommodate the second articulation element 38, and a second flange 60 positioned in a longitudinal plane between the second link 42 and the second part 34, including an orifice 60.1 to accommodate the second articulation element 38. The first and second flanges 58, 60 of the second yoke 50 are separated by a distance greater than or equal to that separating the first and second faces 34.1, 34.2 of the second part 34.

The first flange 58 has an internal face oriented toward the second flange 60 and an external face opposite the internal face, coplanar with the first face of the body 46, constituting a part of the first contact face 44.1 of the interleaved stiffener 44.

The second flange 60 has an internal face oriented toward the first flange 58 and an external face opposite the internal face, coplanar with the second face of the body 46, constituting a part of the second contact face 44.2 of the interleaved stiffener 44.

The first and second yokes 48, 50 and the body 46 are sized to withstand some of the traction and compression forces, complementing the first and second links 40, 42.

In one configuration, at the level of the first flanges 54, 58 of the first and second yokes 48, 50, the interleaved stiffener 44 has a longitudinal section substantially equal to that of the first link 40. At the level of the second flange 56, 60 of the first and second yokes 48, 50 the interleaved stiffener 44 has a longitudinal section substantially equal to that of the second link 42.

In contrast to the prior art, the first and second flanges 54, 56, 58, 60 are not the same thickness as the first and second links 40, 42. Consequently, the thickness of the assembly at the level of the articulation elements 36, 38 is less than that of the prior art assemblies.

In accordance with another feature, the first and second links 40, 42 are held pressed against the interleaved stiffener 44. To this end, the connecting device 30 includes a connecting system for connecting the first and second links 40, 42 and the interleaved stiffener 44.

In a variant that can be seen in FIG. 4, the connecting system includes at least one transverse connecting element 62 passing through the first and second links 40, 42 and the interleaved stiffener 44 to hold them pressed against the interleaved stiffener 44. Each transverse connecting element 62 is oriented in the transverse direction. By way of example, each transverse connecting element 62 is a nut-and-bolt. In one configuration, the connecting device 30 includes a plurality of transverse connecting elements 62 distributed between the first and second articulation elements 36, 38.

Of course, the invention is not limited to this variant. Thus, in accordance with another variant, the connecting system includes at the level of each articulation element 36, 38, a ring 64 surrounding the articulation element 36, 38 on which are force-fitted the first links 40, 42 and the interleaved stiffener 44.

Figure 9:
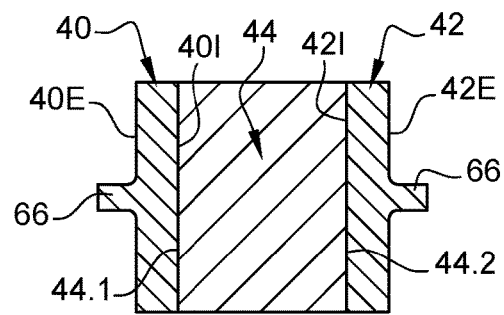
FIG. 9 is a section on the plane PP in FIG. 8.

In accordance with a second embodiment that can be seen in FIGS. 8 and 9, at least one of the first and second links 40, 42 includes at least one longitudinal rib 66 on the external face 40E, 42E of the first and/or second link 40, 42, projecting relative to that external face 40E, 42E, and oriented approximately parallel to the longitudinal direction.

In one configuration, each of the first and second links 40, 42 includes a single longitudinal rib 66 positioned on a longitudinal straight line segment passing through the axes of the first and second orifices 40.1, 42.1, 40.2, 42.2 of the first or second link 40, 42 over virtually all the length separating the first and second orifices 40.1, 42.1, 40.2, 42.2.

In one configuration, the connecting device 30 includes only one first link 40 and only one second link 42. In other words, the connecting device 30 does not include links other than the first and second links 40, 42. The first and second links 40, 42 are arranged on respective opposite sides of the interleaved stiffener 44. The external faces 40E, 42E of the first and second links 40, 42 are free. In other words, the links 40, 42 are not side by side with other links, in particular at the level of their external face 40E, 42E. This advantageously makes it possible to reduce the thickness of the assembly compared to that of prior art assemblies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine attachment including at least one assembly comprising:

a first part, a second part, and a connecting device connecting the first and second parts, the connecting device including:

first and second articulation elements accommodated in first and second holes through the first and second parts, and first and second links, connecting the first and second articulation elements, positioned on respective opposite sides of the first and second parts, the first link having a planar internal face oriented toward the second link, the second link having a planar internal face oriented toward the first link, wherein the connecting device comprises:

an interleaved stiffener positioned between the first and second links, having a first contact face oriented toward the first link and a second contact face oriented toward the second link, parallel to the first face, the first and second contact faces being planar and separated by a distance equal to that separating the first and second links, the planar internal faces of the first and second links being held against the first and second planar contact faces of the interleaved stiffener, the interleaved stiffener including:

a body of parallelepiped shape, a first yoke, connected to the body, cooperating with the first part, and a second yoke, connected to the body at an end opposite the first yoke, cooperating with the second part, the body, the first yoke and the second yoke forming a single part, wherein the interleaved stiffener limits bending of the first and second links when the first and second links are loaded in compression, wherein the interleaved stiffener enables a distance between the first and second links to remain constant in the presence of compression forces and limits transverse bending of the first and second links.

2. The assembly as claimed in claim 1, wherein the first yoke comprises:

a first flange, positioned between the first link and the first part, including an orifice accommodating the first articulation element, a second flange, positioned between the second link and the first part, including an orifice, accommodating the first articulation element, and wherein the second yoke comprises:

a first flange, positioned between the first link and the second part, including an orifice accommodating the second articulation element, a second flange, positioned between the second link and the second part, including an orifice accommodating the second articulation element.

3. The assembly as claimed in claim 2, wherein the first and second flanges of the first and second yokes have external faces coplanar with a first face of the body oriented toward the first link, the external faces of the first flanges and the first face of the body forming the first contact face of the interleaved stiffener, and wherein the second flanges of the first and second yokes have external faces coplanar with a second face of the body oriented toward the second link, the external faces of the second flanges and the second face of the body forming the second contact face of the interleaved stiffener.

4. The assembly as claimed in claim 1, wherein the connecting device includes a system connecting the first and second links and the interleaved stiffener.

5. The assembly as claimed in claim 4, wherein the connecting system includes at least one transverse connecting element passing through the first and second links and the interleaved stiffener configured to maintain the first and second links pressed against the interleaved stiffener.

6. The assembly as claimed in claim 5, wherein the connecting system includes a plurality of transverse connecting elements divided between the first and second articulation elements.

7. The assembly as claimed in claim 4, wherein the connecting system includes, at a level of each articulation element, a ring surrounding the articulation element onto which are force-fitted the first and second links and the interleaved stiffener.

8. The assembly as claimed in claim 1, wherein the body of the interleaved stiffener includes at least one opening.

9. The assembly as claimed in claim 1, wherein at least one of the first and second links includes at least one longitudinal rib on an external face of at least one of the first or second link projecting relative to that external face.

* * * * *